(12) United States Patent
Huda et al.

(10) Patent No.: US 11,886,787 B2
(45) Date of Patent: Jan. 30, 2024

(54) CURVILINEAR DESIGN ADJUSTMENT AT ACUTE-ANGLED TIP

(71) Applicant: ROCKLEY PHOTONICS LIMITED, Altrincham (GB)

(72) Inventors: Gazi Mostafa Huda, Halfmoon, NY (US); Troy Vytautas Tamas, Ventura, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/512,374

(22) Filed: Oct. 27, 2021

(65) Prior Publication Data
US 2022/0138392 A1    May 5, 2022

Related U.S. Application Data

(60) Provisional application No. 63/107,256, filed on Oct. 29, 2020.

(51) Int. Cl.
*G06F 30/39* (2020.01)
*G06F 117/12* (2020.01)

(52) U.S. Cl.
CPC .......... *G06F 30/39* (2020.01); *G06F 2117/12* (2020.01)

(58) Field of Classification Search
CPC ...... G06F 30/39; G06F 2117/12; G06F 30/10; G02B 6/125; G02B 6/136
See application file for complete search history.

(56) References Cited

U.S. PATENT DOCUMENTS

| | | | | |
|---|---|---|---|---|
| 7,811,844 B2* | 10/2010 | Carothers | ........... | H01L 27/0617 438/31 |
| 9,557,486 B2* | 1/2017 | Ma | ........ | G02B 6/2813 |
| 2013/0209112 A1* | 8/2013 | Witzens | ................ | G02B 6/125 385/14 |
| 2014/0091884 A1* | 4/2014 | Flatters | .................... | H01P 5/082 333/254 |
| 2016/0246004 A1* | 8/2016 | Kachru | ................ | G02B 6/4214 |
| 2020/0302211 A1* | 9/2020 | Asano | ..................... | G06V 10/40 |
| 2021/0088727 A1* | 3/2021 | Park | ........................ | G02B 6/13 |
| 2022/0138392 A1* | 5/2022 | Huda | ...................... | G06F 30/39 716/110 |
| 2022/0381034 A1* | 12/2022 | Smith | ..................... | E04D 15/02 |
| 2022/0383741 A1* | 12/2022 | Sanchez | ............... | G08G 1/0962 |

OTHER PUBLICATIONS

"Chapter 3: Runset Functions: J-Z", IC Validator Reference Manual, Dec. 2018, pp. 3-715 through 3-719.

* cited by examiner

*Primary Examiner* — Nha T Nguyen
(74) *Attorney, Agent, or Firm* — Lewis Roca Rothgerber Christie LLP

(57) ABSTRACT

A system and method for adjusting the shapes of polygons in a design. In some embodiments, the method includes inverting a first layer of the design, the first layer comprising one or more polygons, the inverting of the first layer forming a region complementary to the union of the polygons of the first layer, and including one or more inverse polygons. The method may further include performing a rounding operation on a first corner of a first inverse polygon of the one or more inverse polygons, to form a modified polygon.

14 Claims, 1 Drawing Sheet

CURVILINEAR DESIGN ADJUSTMENT AT ACUTE-ANGLED TIP

CROSS-REFERENCE TO RELATED APPLICATION(S)

The present application claims priority to and the benefit of U.S. Provisional Application No. 63/107,256, filed Oct. 29, 2020, entitled "CURVILINEAR DESIGN ADJUSTMENT AT ACUTE-ANGLED TIP", the entire content of which is incorporated herein by reference.

FIELD

One or more aspects of embodiments according to the present disclosure relate to photonic integrated circuits, and more particularly to systems and methods for designing and fabricating photonic integrated circuits.

BACKGROUND

Photonic circuit designs may include features such as regions within which nearly-parallel waveguides merge, which may, if suitable measures are not taken, result in sharp angles in a mask for the photonic circuit. Such sharp angles may result in violations of design rules or in defects in manufactured parts. Removing (e.g., rounding) such sharp angles individually and manually, however, may be time consuming.

Thus, there is a need for an improved system and method for handling sharp angles in the design of a photonic integrated circuit.

SUMMARY

According to an embodiment of the present disclosure, there is provided a method, including: inverting a first layer of a design, the first layer including one or more polygons, the inverting of the first layer forming a region complementary to the union of the polygons of the first layer, and including one or more inverse polygons; and performing a rounding operation on a first corner of a first inverse polygon of the one or more inverse polygons, to form a modified polygon.

In some embodiments, the rounding operation is performed by a sizing function.

In some embodiments: the first corner has an acute interior angle, and the rounding operation includes increasing the effective radius of the first corner.

In some embodiments, the rounding operation includes increasing the effective radius to at least 100 nm.

In some embodiments, the method further includes leaving a second corner of the first inverse polygon substantially unchanged.

In some embodiments, the method further includes determining that the second corner overlaps a polygon of a second layer.

In some embodiments, the method further includes inverting the modified polygon.

In some embodiments, the method further includes fabricating an integrated circuit based on the modified polygon.

According to an embodiment of the present disclosure, there is provided a system including: a processing circuit; and a non-transitory computer-readable medium, the processing circuit being connected to the non-transitory computer-readable medium, the non-transitory computer-readable medium storing instructions that when executed cause the processing circuit to: invert a first layer of a design, the first layer including one or more polygons, the inverting of the first layer forming a region complementary to the union of the polygons of the first layer, and including one or more inverse polygons; and perform a rounding operation on a first corner of a first inverse polygon of the one or more inverse polygons, to form a modified polygon.

In some embodiments, the rounding operation is a performed by a sizing function.

In some embodiments: the first corner has an acute interior angle, and the rounding operation includes increasing the effective radius of the first corner.

In some embodiments, the rounding operation includes increasing the effective radius to at least 100 nm.

In some embodiments, the performing of the rounding operation further includes leaving a second corner of the first inverse polygon substantially unchanged.

In some embodiments, the instructions further cause the processing circuit to determine whether the second corner overlaps a polygon of a second layer.

In some embodiments, the instructions further cause the processing circuit to invert the modified polygon.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1B:
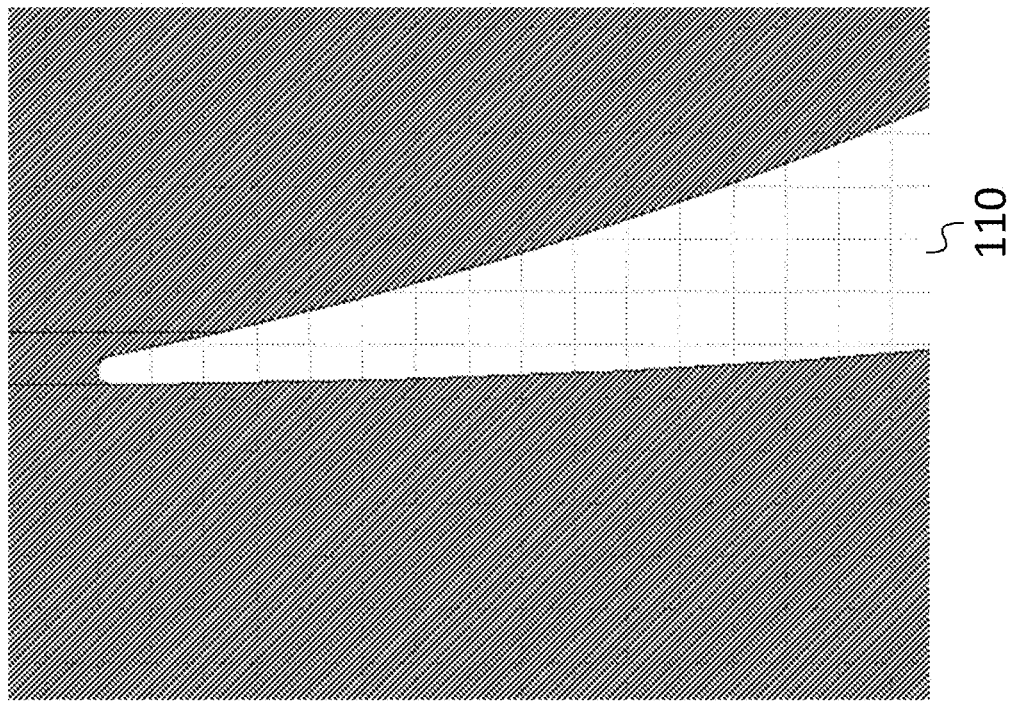
FIG. 1B shows a portion of a photonic integrated circuit design, according to an embodiment of the present disclosure.

The detailed description set forth below in connection with the appended drawings is intended as a description of exemplary embodiments of a system and method for adjusting the shapes of polygons in a design provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Photonic integrated circuits may be fabricated by processes similar to those employed to fabricate electronic integrated circuits. A design for a photonic integrated circuit may be represented by a set of layers, each of which may identify portions of the partially fabricated photonic integrated circuit to be treated in a certain manner, during a certain processing step. For example, a physical mask may be generated from one or more layers, and may be used for photolithography. As another example, a layer may be a set of data instructing an electron beam lithography machine which part of a surface of the partially fabricated photonic integrated circuit should be exposed to the electron beam. Each layer of the design may include one or more polygons the union of which identifies an area to be treated in a certain manner. Each polygon may have a plurality of vertices, or "corners".

Manufacturing rule checks and design rule checks may be applied to such layers before beginning fabrication, to avoid attempting a fabrication process with one or more layers or masks that are likely to produce defective photonic integrated circuits. Such rules may specify, for example, that an etched region may not have a corner with an acute interior angle, or with an angle less than some other threshold (which may be greater or less than 90 degrees). Such an angle may be referred to herein as a "sub-threshold interior angle" for a given threshold (e.g., a sub-threshold angle for a threshold of 90 degrees is an acute angle). As used herein, an "interior angle" at a corner of a polygon is the angle, at the corner, that is on the interior of the polygon, and an "exterior angle" at a corner of a polygon is the angle, at the corner, that is on the exterior of the polygon. As such, an "acute interior angle" is an angle of less than 90 degrees, on the side of a corner of a polygon that is on the interior of the polygon. If, at a corner of a polygon, the interior angle is less than 180 degrees (i.e., it is obtuse, right, or acute), the exterior angle at the corner is a reflex angle (i.e., an angle greater than 180 degrees and less than 360 degrees). If the interior angle at a corner of a polygon is a reflex angle (which may occur if the polygon is a concave polygon), then the exterior angle is less than 180 degrees (i.e., it is obtuse, right, or acute).

In some circumstances, a manufacturing rule check or a design rule check intended to be used with designs employing "Manhattan" or "right angle" wiring may identify a portion of a design, which may include features having angles that are not right angles, as violating a rule when in fact the portion at issue would not carry a significant risk of resulting in a fabrication failure. This may occur, for example, if a polygon includes an acute exterior angle, or an obtuse exterior angle, which may be deemed, by a manufacturing rule or a design rule intended for use with Manhattan wiring, to violate a minimum spacing rule.

Features that violate design rules may tend to occur in photonic integrated circuits, in situations, for example, at the input or output of a bend in an array of waveguides, in which the waveguides are sufficiently close together such that the slab portions of the rib waveguides merge into a shared slab. As shown in FIG. 1A, the point at which any two slab portions merge may tend to form an etched region 105 (which is the wedge-shaped trench between slabs of adjacent waveguides) with a sharp angle (e.g., an acute angle) at the point at which the slabs merge (and the trench ends). A large number of such features may be present in a photonic integrated circuit design and it may be time-consuming to make adjustments to the design manually, to solve all of the manufacturing and design rule errors such features may generate.

Figure 1A:
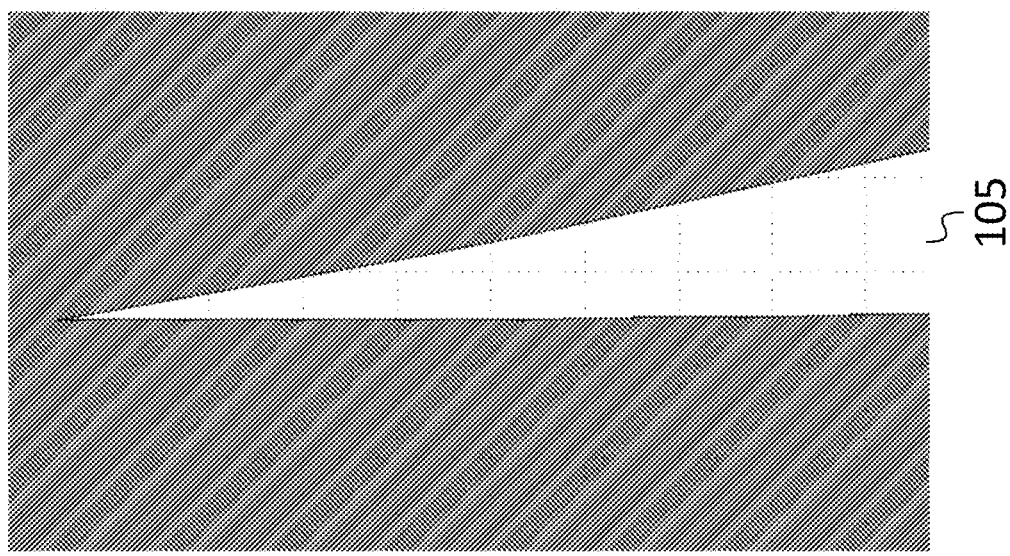
FIG. 1A shows a portion of a photonic integrated circuit design.

In some embodiments, a design may be modified as follows, to avoid violating manufacturing rule checks and design rule checks, resulting, for example, as shown in FIG. 1B, in a modified trench 110 having a rounded narrow end. The modifying of the design may be referred to as performing a "rounding operation" on one or more layers of the design. The performing of the rounding operation on a first layer of the design (in which one or more sharp angles may be present and which may include a first set of polygons) may proceed as follows. First, the first layer may be inverted, converting the first set of polygons into a second set of polygons, which may be referred to as "inverse polygons" and the union of which is the complement of the union of the first set of polygons. Next, a rounding operation may be performed on the set of inverse polygons, to round sharp corners (each of which may be a corner having a sub-threshold interior angle (e.g., an acute interior angle)). As used herein, a "rounding operation" performed on a shape (e.g., on a polygon) is an operation that causes the shape to become more round (e.g., that replaces a corner of the polygon with a circular arc, or with a set of line segments approximating a circular arc, as discussed in further detail below).

The effect of the rounding may be to increase the effective radius of such a corner (e.g., to increase the effective radius of the corner to a minimum radius, the minimum radius being, e.g., between 10 nm and 3,000 nm). As used herein, if the corner is moved (e.g., replaced by a plurality of new corners, none of which is at the position of the original corner), then the change in the effective radius is the difference between (i) the effective radius of the new corner nearest the position of the original corner and (ii) the effective radius of the original corner. As used herein, the "effective radius", for a first threshold angle, of a corner at which two sides (or "polygon sides") of the polygon meet is (i) zero if the corner has a sub-threshold angle for the first threshold and, otherwise, (ii) the radius of the circle passing through the corners of an isosceles triangle having a first vertex with the same angle as the corner, and two sides, intersecting at the first vertex, both having the same length as the shorter one of the two polygon sides (or as both polygon sides, if the two polygon sides have the same length). In the present disclosure, when the threshold angle is not explicitly specified, the threshold angle is 90 degrees. The modified polygons may then be inverted again, to form a layer in which, e.g., trenches (such as the trenches between adjacent rib waveguide slabs) with sharp ends have been modified to have rounded ends.

In some embodiments, the rounding operation is performed by a sizing function, such as the size( ) function of IC Validator, available from Synopsys (synopsys.com). Listing 1 is an example of a rounding function implemented using the size( ) function. When a sizing function is used to perform the rounding operation, the sizing function may initially be called (e.g., at line 6 of Listing 1) before the first layer is inverted, and it may then be called again (e.g., at line 8 of Listing 1), with the same value for the size distance, after the layer has been inverted (e.g., at line 7 of Listing 1). This may have the effect that each long polygon edge (e.g., each edge that is significantly longer than the size distance) is displaced, e.g., in a first direction, by the size distance, by the first call to the sizing function, and the edge is then, as a result of the second call to the sizing function (after the first layer has been inverted), displaced, by the size distance, in a direction opposite to the first direction, so that the edge is substantially placed back in the position it occupied in the original first layer. The first call to the sizing function (e.g., at line 6 of Listing 1) may use (as shown) the default values of all arguments accepted by the size( ) function, except for the layer and the size distance (which may be a positive value (so that the size of each polygon is increased) between 0.01 and 2.00 microns). When the sizing function is called the second time (e.g., at line 8 of Listing 1) it may be called, for example, using the same size distance (represented by the variable "sizing" in Listing 1), a value of corner_extension of "RADIAL_INSIDE", a value of radial_sectors of 2, and a value of clip_acute of OCTAGONAL.

Listing 1

```
1   fix_sharp_angles : function (
2       lyr1  : polygon_layer,
3       sizing: double
4   ) returning result: polygon_layer
5   {
6      lyr1_up = size (lyr1, sizing);
7      lyr1_inverse = negate (layer1 = lyr1_up, border=1.0);
8      lyr1_shrunk_inverse = size(lyr1_inverse, sizing,
           corner_extension = RADIAL_INSIDE, radial_sectors = 2,
           clip_acute = OCTAGONAL);
9      result = lyr1_up not lyr1_shrunk_inverse;
10  }
```

In some embodiments, another layer, which may be referred to as the "waveguide core intent layer" may be used to identify regions in which significant optical power will be propagating in operation. The waveguide core intent layer may include the ribs of rib waveguides, or the strips of strip waveguides, for example. In some embodiments, the rounding operation is performed only for corners that are not within any of the polygons of the waveguide core intent layer, to avoid affecting the optical characteristics of the photonic integrated circuit. For example, any corner, of any of the inverse polygons, that is within any of the polygons of the waveguide core intent layer may be left substantially unchanged. As used herein, leaving a corner "substantially unchanged" means moving it, or changing its angle, sufficiently little that the propagation of light in any waveguides near the corner is not significantly affected. Leaving a corner substantially unchanged may mean, e.g., changing the position of the corner by at most a first maximum value (e.g. a first maximum value between 10 nm and 3,000 nm) or changing the effective radius of the corner by at most a second maximum value (e.g. a second maximum value between 10 nm and 3,000 nm).

In some embodiments, this rounding operation of the first layer (which performs selective rounding of corners, depending in part, for each corner, on whether it is within a polygon of the waveguide core intent layer) is accomplished as follows, and as shown in Listing 2 (below). First, in line 1 of Listing 2, the function fix_sharp_angles( ) is called to (i) invert the first layer (referred to as "WG_RIBS_CLAD" in Listing 2), (ii) perform a rounding operation on each of the inverse polygons, and (iii) re-invert the rounded inverse polygons, to form a rounded version of the first layer (referred to as "WG_RIBS_ROUND" in Listing 2). Next, in line 2 of Listing 2, a "not" operation is performed between the original version of the first layer and the rounded version of the first layer, to generate a set of polygons (referred to herein as "slivers", and referred to as "WG_RIBS_SEMI" in Listing 2) that consist of the fills added at sharp corners to change them to more rounded corners.

The slivers that overlap with the waveguide core intent layer are then removed, e.g., using a call to not_interacting( ) as shown in in line 3 of Listing 2, (in which the combination "XX_MASK_CLEAR and WG_CORE" is the waveguide core intent layer) and, in line 4 of Listing 2, the remaining slivers (referred to as "WG_RIBS_MASK" in Listing 2) are combined with the original polygons (in WG_RIBS_CLAD) to form a modified layer in which a rounding operation has been performed on polygon corners that are not within polygons of the waveguide core intent layer.

Listing 2

```
1   WG_RIBS_ROUND = fix_sharp_angles(WG_RIBS_CLAD,
        size_distance);
2   WG_RIBS_SEMI = WG_RIBS_ROUND not WG_RIBS_CLAD;
3   WG_RIBS_MASK = not_interacting(WG_RIBS_SEMI,
        (XX_MASK_CLEAR and WG_CORE));
4   WG_RIBS_FINAL = WG_RIBS_MASK or WG_RIBS_CLAD;
```

Once a design has been modified as described herein (e.g., with some or all of the acute-angled corners in a layer having been replaced by sets of obtuse angles) the modified design may be used to fabricate an integrated circuit (e.g., a photonic integrated circuit). This fabricating may involve performing etching or fabrication steps based on (e.g., based on masks created using) the modified design (e.g., one or more modified layers of (or modified polygons of one more layers of) the modified design).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second number is "within Y %" of a first number, it means that the second number is at least $(1-Y/100)$ times the first number and the second number is at most $(1+Y/100)$ times the first number. As used herein, the word "or" is inclusive, so that, for example, "A or B" means any one of (i) A, (ii) B, and (iii) A and B. As used herein, the "difference between A and B" means A-B.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. A processing circuit may be, or may include, a stored-program computer, and it may include, or be connected to, a non-transitory computer readable medium storing instructions that, when executed by the processing circuit, cause the processing circuit to perform methods described herein.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for adjusting the shapes of polygons in a design have been specifically described and illustrated herein, many modifications and variations will be apparent to those skilled in the art. Accordingly, it is to be understood that a system and method for adjusting the shapes of polygons in a design constructed according to principles of this disclosure may be embodied other than as specifically described herein. The invention is also defined in the following claims, and equivalents thereof.

What is claimed is:

1. A method, comprising:
inverting a first layer of an integrated circuit design, the first layer comprising one or more polygons, the inverting of the first layer forming a region complementary to a union of the polygons of the first layer, and comprising one or more inverse polygons;
performing a rounding operation on a first corner of a first inverse polygon of the one or more inverse polygons, to form a modified polygon; and
inverting the modified polygon to provide a modified first layer.

2. The method of claim 1, wherein the rounding operation is performed by a sizing function.

3. The method of claim 1, wherein:
the first corner has an acute interior angle, and
the rounding operation comprises increasing the effective radius of the first corner.

4. The method of claim 3, wherein the rounding operation comprises increasing the effective radius to at least 100 nm.

5. The method of claim 1, further comprising leaving a second corner of the first inverse polygon substantially unchanged.

6. The method of claim 5, further comprising determining that the second corner overlaps a polygon of a second layer.

7. The method of claim 1, further comprising fabricating an integrated circuit based on the modified polygon.

8. A system comprising:
a processing circuit; and
a non-transitory computer-readable medium,
the processing circuit being connected to the non-transitory computer-readable medium,
the non-transitory computer-readable medium storing instructions that when executed cause the processing circuit to:
invert a first layer of an integrated circuit design, the first layer comprising one or more polygons, the inverting of the first layer forming a region complementary to a union of the polygons of the first layer, and comprising one or more inverse polygons;
perform a rounding operation on a first corner of a first inverse polygon of the one or more inverse polygons, to form a modified polygon; and
inverting the modified polygon to provide a modified first layer.

9. The system of claim 8, wherein the rounding operation is a performed by a sizing function.

10. The system of claim 8, wherein:
the first corner has an acute interior angle, and
the rounding operation comprises increasing the effective radius of the first corner.

11. The system of claim 10, wherein the rounding operation comprises increasing the effective radius to at least 100 nm.

12. The system of claim 8, wherein the performing of the rounding operation further comprises leaving a second corner of the first inverse polygon substantially unchanged.

13. The system of claim 12, wherein the instructions further cause the processing circuit to determine whether the second corner overlaps a polygon of a second layer.

14. A method, comprising:
inverting a first layer of an integrated circuit design, the first layer comprising one or more polygons, the inverting of the first layer forming a region complementary to a union of the polygons of the first layer, and comprising one or more inverse polygons; and
performing a rounding operation on a first corner of a first inverse polygon of the one or more inverse polygons, to form a modified polygon, wherein the rounding operation is performed by a sizing function.

* * * * *